Nov. 18, 1947.     A. J. HODGES     2,430,876
METHOD OF AND APPARATUS FOR TESTING THE HARDNESS OF MATERIALS
Filed Feb. 26, 1945
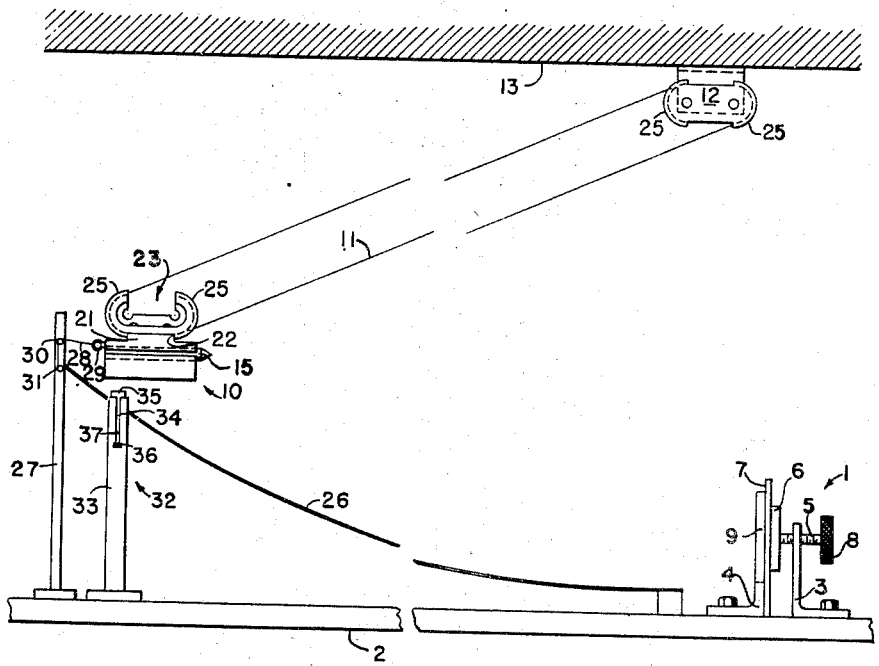
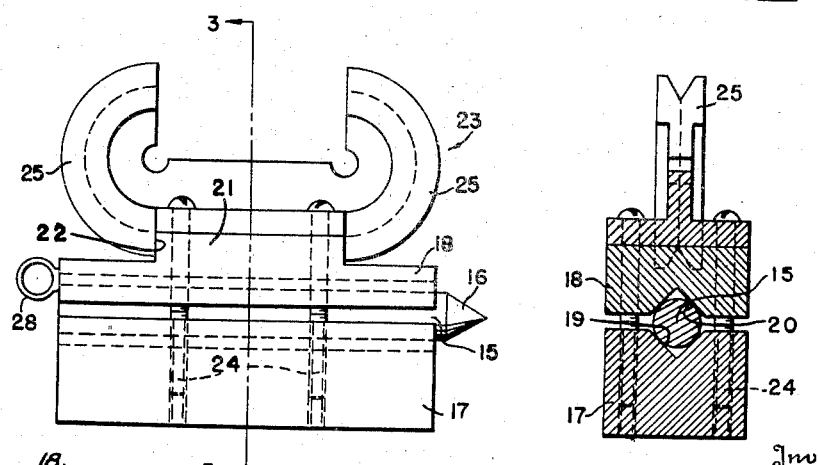
ARTHUR J. HODGES
By Ralph L. Chappell
Attorney Patented Nov. 18, 1947

2,430,876

UNITED STATES PATENT OFFICE 2,430,876

METHOD OF AND APPARATUS FOR TESTING THE HARDNESS OF MATERIALS

Arthur J. Hodges, Washington, D. C.

Application February 26, 1945, Serial No. 579,820

4 Claims. (Cl. 73—81)

(Granted under the act of March 3, 1883, as amended April 30, 1928; 370 O. G. 757)

This invention relates to a method of and apparatus for testing the hardness of materials, and more particularly to a method of and apparatus for dynamically testing the hardness of materials.

One practice in ascertaining the hardness of materials has been to employ a device known as a static hardness tester. As is well known, a static hardness test depends in large part upon the length of time for which the load is applied. Some materials, and particularly some plastic materials, have been found to be so sensitive to the loading time that the accuracy of the static hardness test is materially affected, and consequently test results may be rendered very inaccurate thereby. Another factor adversely influencing the accuracy of static hardness testing devices is the recovery of the material after the load has been applied.

In order to overcome the difficulties and inaccuracies inherent in static testing devices, efforts have been made to provide a dynamic hardness test. Heretofore, such tests have been performed by causing an object to strike the surface of a material to be tested and then observing the rebound distance of the object. The rebound distance, however, depends in large part upon the inherent elasticity or resiliency of the material being tested and the measurements obtained may thus be more accurate as an indication of the elasticity or resilience of the material than of the hardness.

An object of the present invention is to provide an efficient and effective method of an apparatus for dynamically testing the hardness of materials.

In accordance with one embodiment of this invention a conical indenter suspended at the lower end of a pendulum is provided with a coating of wax on its conical portion, and caused to strike the surface of the material being tested. By observing the distance the wax coating is wiped back, due to the penetration of the indenter into the material being tested, it is possible to calculate the hardness of the material in terms of the kinetic energy of the indenter immediately prior to impact and the maximum area of the material in contact with the indenter during penetration.

Other objects and advantages of the present invention will be apparent from the following detailed description taken in conjunction with the drawings wherein:

Fig. 1 is a fragmentary side elevation of a dynamic hardness testing apparatus constructed in accordance with the present invention;

Fig. 2 is a detailed side view of the conical indenter of the present invention;

Fig. 3 is a vertical sectional view along the line 3—3 of Fig. 2; and

Fig. 4 is an enlarged, fragmentary view of the indenter shown in Fig. 2 after the coating thereon has been partially removed by striking the material being tested.

Referring now to the drawings and particularly to Fig. 1 thereof, it will be seen that this apparatus includes a vise 1 mounted on a horizontally disposed platform 2. The vice comprises two fixed, opposed, L-shaped members 3 and 4, respectively, which are securely bolted to the platform. The upright portion of the right member 3 is transversely apertured and the aperture is internally threaded to receive and engage a threaded shaft 5 which extends therethrough and which carries on its inner end a clamping block 6. As shown in this figure, a specimen plate 7 is clamped against the upright portion of the L-shaped member 4 by this clamping block. Rotation of the threaded shaft 5 to release the specimen plate 7 or to tighten it in place is facilitated by a knurled knob 8 fixed to the right end of the shaft.

The upper portion 9 of the L-shaped member 4 is bifurcated to permit a conical indenter 10, which is suspended as a pendulum at the lower end of a loop 11 of thin, highly flexible wire to contact the surface of the specimen plate clamped in the vise 1. The loop 11 is suspended at its upper end by a spool 12 which is mounted on the under side of a crossbeam 13. The loop is fixed to the center of the upper portion of the spool by suitable means to prevent slipping of the loop during the movement of the pendulum. The spool 12 is so located with respect to the vise 1 that the indenter at the bottom of its arc of movement as a pendulum will strike the specimen plate at an angle precisely normal thereto.

More specifically, as shown in Figs. 2 and 3, the indenter comprises a shaft 15 of hardened steel having a conical end portion 16. While a conical tip is preferable for most uses, a pyramidal, wedge or rounded end may be employed, as required. The shaft is rigidly clamped between a pair of blocks 17 and 18. Grooves 19 and 20 are formed in the opposed faces of the blocks 17 and 18, respectively, and extend longitudinally thereof. The shaft 15 is received in the grooves as shown in Fig. 3 and aligned thereby with the blocks 17 and 18. The upper block 18 is provided with a rectangular raised portion 21 on its upper side and this fits closely into a transverse slot 22 formed in the underside of a spool 23. The spool 23 is rigidly secured to the upper block 18 by bolts 24 which extend through the base of the spool and through the block 18 and are then threaded into the lower block 17. Loosening the bolts 24 permits removal of the shaft 15 and adjustment of the position of indenter on the loop 11 so that the indenter will contact the specimen plate at an angle exactly normal thereto.

The spool 12 and spool 23 are of identical size and shape, both being provided with semi-circular ends 25 which are grooved to receive the indenter suspending loop 11 which passes around the spools. The centers of the semi-circular ends are spaced substantially apart in order to prevent twisting of the indenter during its arc of movement. At the same time, by making the ends exactly the same distance apart on both spools, it will be apparent that the separation between the spool 12 and the spool 23 is maintained constant. For example, in the relative positions of the spools illustrated in Fig. 1, the left portion of the wire loop 11, is substantially unwrapped from the left end of the spool 12, while it has wrapped an equivalent amount around the left end of the spool 23. The converse has occurred with respect to the right ends. Thus the effective lengthening of the loop 11 which occurs at the upper spool 12 is exactly compensated at the lower spool 23. A spool and strand loop support is preferable in this type of apparatus over the knife edge support, generally employed with pendulums, because of the considerable shock which occurs upon the indenter striking the specimen plate.

In the operation of this apparatus, the specimen plate 7 of the material to be tested is clamped in the holder or vise 1. The end portion 16 of the indenter is coated with a suitable material 14 such as a thin film of wax or modelling clay. The coating material must be one which will not stick to the surface of the specimen plate and which will not flow down the cone surface after rebound of the indenter. A suitable coating material is sold commercially as "Plasteline" by the Devoe and Reynolds Company, Inc., of New York, New York.

After coating, the indenter is swung to the left to a position which may be selected by reference to a graduated strip 26 which extends along the path of the indenter and which is secured at its lower end to the vise 1 and at its upper end to a post 27. The indenter is secured in raised position by a thread 28, one end of which is attached to a ring 29 fixed to the rear of the block 18 and the other end of which passes over a stub 30, mounted on the upper portion of the post 27 and extending at right angles thereto. The thread is secured to a lug 31 mounted on the post 27 somewhat beneath the stub 30.

Prior to releasing the indenter, the indenter is steadied by a damping device 32, shown in Fig. 1. This device comprises a vertically disposed tubular housing 33 having a second tube 34 coaxially mounted in its upper portion and longitudinally movable therein. A tuft 35 of cotton or other suitable material projects from the upper end of the tube 34 and is engageable with the underside of the indenter by moving the tube 34 upwards. A knob 36, fixed to and extending at right angles from the side of the tube 34 through a vertical slot 37 formed in the upper portion of the tubular housing 33, facilitates manual movement of the tuft.

While the indenter may be released simply by cutting the thread 28, it has been found that in cutting the thread some undesirable movement may be imparted to the indenter. In order to avoid this, in practicing the method of this invention, the thread is severed by a flame from any suitable source, such, for example, as a match. Upon severing the thread, the indenter swings downward and the conical portion thereof strikes the surface of the specimen plate. Penetration of the plate by the conical end of the indenter causes the coating on the end of the cone to be wiped or pushed back a distance equivalent to the depth of penetration, as shown in Fig. 4.

If the cone angle be known and the diameter of the wiped portion be measured, the volume of the wiped cone may then be calculated according to the following formula:

$$\text{Volume} = \pi d^3 / 24 \tan \theta$$

where $\theta$ is ½ the cone angle and $d$ is the diameter of the base of the wiped cone.

The hardness of the material being tested is then calculated in accordance with the following formula: Hardness equals $E/V$, wherein $E$ is the kinetic energy of the indenter immediately prior to impact and $V$ is the volume of the portion of the indenter penetrating the material.

While but one embodiment of this invention has been shown and described, it will be understood that many changes and modifications may be made therein without departing from the spirit or scope of the present invention.

The invention described herein may be manufactured and used by or for the Government of the United States of America for government purposes without payment of any royalty thereon or therefor.

What is claimed is:

1. In an apparatus for testing the hardness of a material, means for holding the material, an indenter, and a constant-length pendulum support for said indenter comprising a spool fixed to said indenter and having semi-circular end portions, a second spool mounted on said apparatus above said holder and having identical semi-circular end portions, and a loop of strand material for supporting said first spool from said second spool, said loop passing around the peripheries of both spools.

2. A method of testing the hardness of a material comprising causing a coated indenter to penetrate the material and then measuring the distance the coating is wiped back to ascertain the volume of indentation as an index of hardness.

3. In an apparatus for testing the hardness of a material, an indenter, and a constant length pendulum support for said indenter comprising a spool fixed to said indenter and having semi-circular end portions, a second spool mounted on said apparatus above said indenter and having substantially identical semi-circular portions, and a loop of strand material for supporting said first spool from said second spool, said loop passing around the peripheries of both spools.

4. In an apparatus for testing the hardness of a material, means for holding the material, an indenter, a coating on said indenter, said coating being formed of a wax-like material, and means for causing said coated portion of said indenter to penetrate the material.

ARTHUR J. HODGES.

REFERENCES CITED

The following references are of record in the file of this patent:

UNITED STATES PATENTS

| Number | Name | Date |
|---|---|---|
| 1,429,481 | Ayers, Jr. | Sept. 19, 1922 |
| 1,773,802 | Ballentine | Aug. 26, 1930 |
| 2,207,502 | Zamboni | July 9, 1940 |

OTHER REFERENCES

"Mechanical Testing" by Batson and Hyde. Published by Chapman & Hall Ltd., London, vol. 1, pages 270 and 285. (Copy in Div. 36 of U. S. Patent Office.)